US 9,047,263 B2

(12) United States Patent
Wynn (10) Patent No.: US 9,047,263 B2
(45) Date of Patent: Jun. 2, 2015

(54) SYSTEM AND METHOD FOR SECURE SMI MEMORY SERVICES

(71) Applicant: Allen Wynn, Round Rock, TX (US)

(72) Inventor: Allen Wynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 270 days.

(21) Appl. No.: 13/749,448

(22) Filed: Jan. 24, 2013

(65) Prior Publication Data

US 2014/0207988 A1    Jul. 24, 2014

(51) Int. Cl.
*G06F 13/24*    (2006.01)

(52) U.S. Cl.
CPC ............. *G06F 13/24* (2013.01); *Y02B 60/1228* (2013.01)

(58) Field of Classification Search
CPC ....... G06F 13/24; G06F 9/4812; G06F 13/26; G06F 1/3203; G06F 9/45533
USPC .................................................. 710/260–269
See application file for complete search history.

(56) References Cited

U.S. PATENT DOCUMENTS

| | | | |
|---|---|---|---|
| 6,243,809 B1 * | 6/2001 | Gibbons et al. .................... 713/1 |
| 6,317,798 B1 * | 11/2001 | Graf ................................ 710/15 |
| 6,400,823 B1 * | 6/2002 | Angelo ......................... 380/255 |
| 6,914,690 B1 * | 7/2005 | Uchida ......................... 358/1.14 |
| 7,610,426 B1 | 10/2009 | Dunn ............................. 710/267 |
| 7,831,777 B2 | 11/2010 | de Mevergnies et al. ...... 711/145 |
| 7,925,815 B1 | 4/2011 | Dunn ............................ 710/316 |
| 2003/0135534 A1 * | 7/2003 | Nalawadi et al. ............. 709/100 |
| 2007/0168754 A1 * | 7/2007 | Zohar et al. ...................... 714/42 |
| 2007/0283138 A1 * | 12/2007 | Miga et al. ......................... 713/2 |
| 2008/0298588 A1 * | 12/2008 | Shakkarwar .................. 380/255 |
| 2009/0083846 A1 * | 3/2009 | Ding ............................... 726/12 |
| 2012/0084552 A1 * | 4/2012 | Sakthikumar et al. ........ 713/100 |

FOREIGN PATENT DOCUMENTS

| | | | | |
|---|---|---|---|---|
| EP | 0824233 A2 * | 2/1998 | ............. G06F 1/00 |
| EP | 0851335 A2 * | 7/1998 | ............. G06F 21/00 |
| EP | 0924610 A2 * | 6/1999 | ............. G06F 9/445 |
| JP | 2002342158 A * | 11/2002 | ............. G06F 12/06 |

OTHER PUBLICATIONS

Starke, R.A.; de Oliveira, R.S., "Impact of the x86 System Management Mode in Real-Time Systems," Computing System Engineering (SBESC), 2011 Brazilian Symposium on , pp. 151-157, Nov. 7-11, 2011.*

(Continued)

*Primary Examiner* — Faisal M Zaman
(74) *Attorney, Agent, or Firm* — Baker Botts L.L.P.

(57) ABSTRACT

In accordance with the present disclosure, a system and method are herein disclosed for providing secure SMI memory services, including the protection of SMM memory from surreptitious attacks by, for example, rootkits. Information handling systems are susceptible to attacks, especially attacks on SMM memory. In one example, an SMI handler corresponding to the SMI Driver associated with an SMI interrupt performs validation of a password. An SSMS driver allocates memory for the SMI handler to use with the validation process and also performs a secure erase of allocated memory blocks upon completion of all secure SMI Memory Services. By controlling the validation and secure erase process through the use of the SMI handler and SSMS driver, information leakage can be prevented resulting in system data integrity.

21 Claims, 4 Drawing Sheets

(56) References Cited

OTHER PUBLICATIONS

Delgado, B.; Karavanic, K.L., "Performance implications of System Management Mode," Workload Characterization (IISWC), 2013 IEEE International Symposium on, pp. 163-173, Sep. 22-24, 2013.* http://www.theinquirer.net; Nick Farrell; "Security flaw found in x86 Chips"; pp. 3, Mar. 20, 2009.
http://invisiblethingslab.com ; Wojtczuk et al.; "Attacking SMM Memory via Intel® CPU Cache Poisoning"; pp. 6, 2009.

* cited by examiner

SYSTEM AND METHOD FOR SECURE SMI MEMORY SERVICES

TECHNICAL FIELD

The present disclosure relates generally to computing systems and information handling systems, and, more particularly, to a system and method for providing secure system management interrupt (SMI) memory services in a computing system or information handling system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system will typically include some type of temporary information storage medium, such as random access memory (RAM) or system management RAM (SMRAM). The amount of memory included in an information handling system may be on the order of gigabytes. As memory size increases, the likelihood that part of the memory will either be manufactured defective or become defective over time increases. If left unmanaged, the presence of defective memory cells, regardless of their size, can cause the information handling system to fail. Such failure can initiate an abrupt end to the current operation of the information handling system, resulting in the loss of critical data. A memory failure could also prevent the information handling system from starting up altogether.

As information handling systems continue to evolve and computer technology advances, the operational relationship between the CPU and memory becomes more significant and complex. Many attributes of modern systems (specifically, the introduction of multi-core processors and virtualization) are contributing to an ever-larger memory footprint within a typical information handling system. Consequently, not only is system memory becoming a much more substantial percentage of the overall cost of the information handling solution, the impact of erroneous behavior in the memory can have a much more adverse effect on the life cycle expense associated with the information handling system.

Information handling systems also continue to evolve and computer technology continues to advance to provide for efficient management of energy consumption. Many information handling systems and computer systems include a system management mode (SMM) that allows energy conservation to be built into the system. SMM can initiate a sleep mode or energy conservation mode during periods of processing inactivity that can include turning off of peripheral devices, parts of the system, the entire system, etc. During these periods of inactivity, the information handling or computer system's status is maintained in SMRAM which is a secure area of memory.

SUMMARY

In accordance with the present disclosure, a system and method are herein disclosed for providing secure SMI memory services. The system and method described herein involve the management of the memory resources of an information handling system. The system and method involve securing SMI memory services.

In an information handling system, system memory is vulnerable to destructive attacks by vicious predators such as rootkit attacks and other destructive programs.

The system and method disclosed herein are technically advantageous because a mechanism is provided for eliminating the risks of system memory attacks and compromises to data storage posed by such attacks. In particular, the present disclosure provides a way for an information handling system to provide secure SMI memory services (SSMS) in SMI that allows any SMI driver to allocate memory for use while processing SMI, with the guarantee that the contents of the memory will be overwritten before exiting SMI. This overwriting obviates the need for each SMI driver to implement methods for ensuring that sensitive temporary data is expunged before exiting SMI. By effectively protecting system memory from vicious attacks that could destroy or compromise sensitive temporary data, data integrity is preserved. For example, the present invention prevents information leakage. Overall system costs for the information handling system are correspondingly reduced as destructive attacks that allow sensitive information to be accessed surreptitiously by another system or program are prevented. Other technical advantages will be apparent to those of ordinary skill in the art in view of the following specification, claims, and drawings.

According to a specific example embodiment of this disclosure, an information handling system may comprise a method for providing secure SMI memory services, said method comprising the steps of; requesting one or more actions, triggering an SMI interrupt, entering SMM, initiating an SMI driver associated with the SMI interrupt, initiating one or more SMI handlers registered to the SMI driver associated with the triggered SMI interrupt, requesting for each of the SMI handlers an allocation of one or more blocks of memory from a secure SMI memory services driver, wherein the one or more blocks of memory is requested from a memory pool associated with SMM memory, and performing one or more actions by the SMI handler, wherein the SMI handler uses one or more of the allocated blocks of memory; and performing a secure erase of each block of memory by the secure SMI memory services driver after performing the one or more actions. In another embodiment, the one or more actions includes at least one of a request to perform a password validation, alter system setup variables, perform thermal management and perform power management. In yet another embodiment, the method comprises validating a password against a system password before performing the one or more actions and the method may further comprise hashing or transposing the password prior to validating the password.

In another example embodiment, the method further comprises performing a secure erase of the one or more blocks of memory prior to performing the one or more actions by the SMI handler and another embodiment further comprises deallocating the one or more blocks of memory prior to exiting the SMM and in another embodiment the method further comprises performing SMM exit tasks and performing secure SMI memory services exit tasks.

According to another example embodiment of this disclosure, an information handling system for securing SMI memory services comprising, a main memory; a system management mode, wherein SMM memory is part of the main memory, a memory pool, wherein the memory pool is reserved memory within SMM memory and includes one or more blocks of memory, a system management interrupt (SMI) driver, wherein the SMI driver is initiated by triggering an SMI interrupt and wherein the one or more blocks of memory is communicatively coupled to one or more SMI handlers associated with the SMI driver, and a secure SMI memory services (SSMS) driver wherein the SMI driver is communicatively coupled to the one or more SMI handlers and the block of memory, wherein the SSMS driver allocates the block of memory upon a request from the one or more SMI handler, wherein the one or more SMI handlers uses the allocated block of memory to perform one or more actions, and wherein the SSMS driver performs a secure erase of the block of memory upon completion of the one or more actions by the SMI driver. In another embodiment, the block of memory is system management RAM. In yet another embodiment the SMI driver initiates the SSMS driver to deallocate the block of memory upon completion of the one or more actions by the SMI driver.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), system management RAM (SMRAM), one or more processing resources such as a central processing unit (CPU) or hardware or software control logic, ROM, and/or other types of nonvolatile memory. Additional components of the information handling system may include a storage management initiative standard interface (SMI), one or more disk drives, one or more network ports for communication with external devices as well as various input and output (I/O) devices, such as a keyboard, a mouse, and a video display. The information handling system may also include one or more buses operable to transmit communications between the various hardware components.

Referring now to the drawings, the details of specific example embodiments are schematically illustrated. Like elements in the drawings will be represented by like numbers, and similar elements will be represented by like numbers with a different lower case letter suffix.

Figure 1:
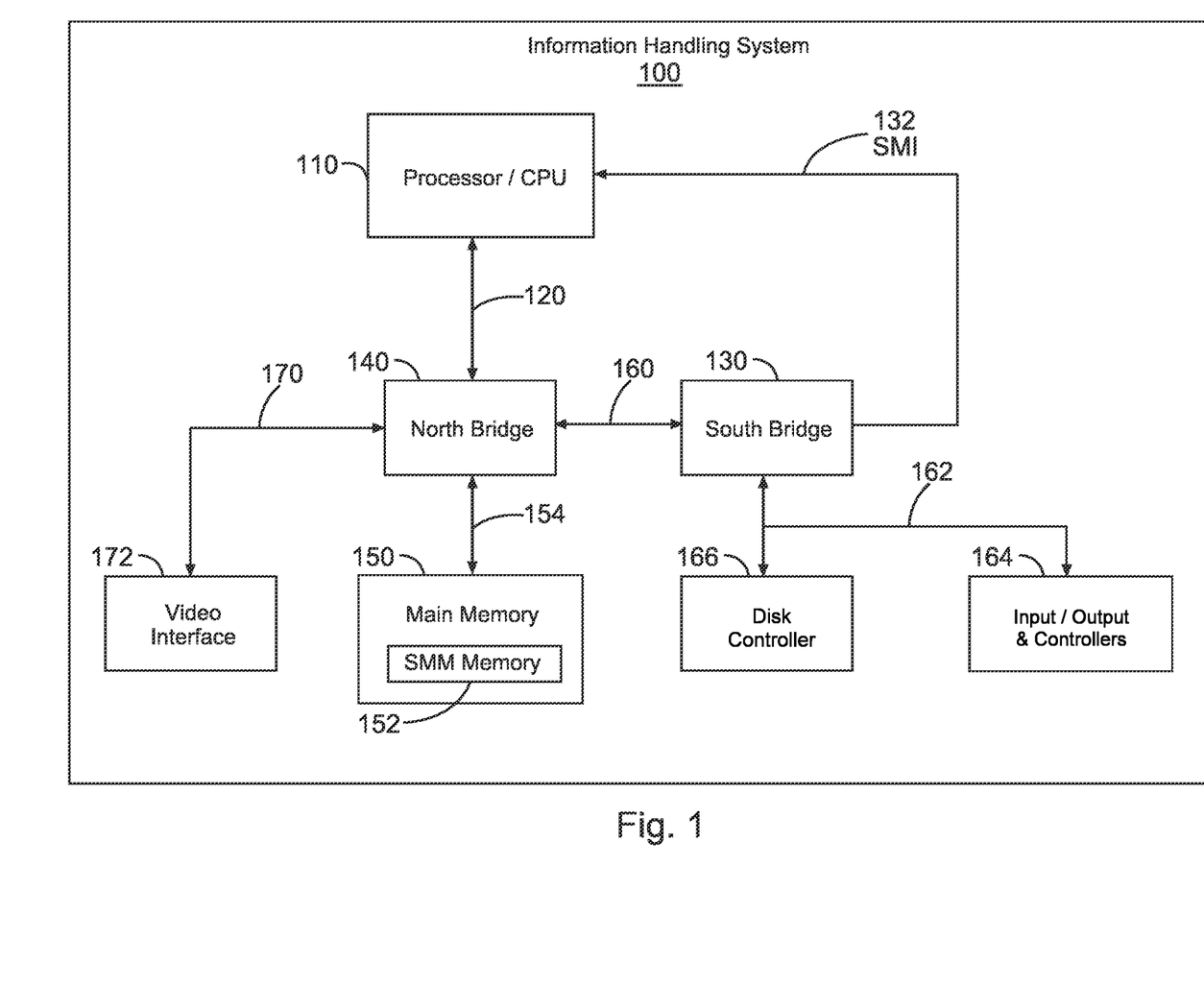
FIG. 1 is a block diagram of an information handling system.

Referring to FIG. 1, depicted is a block diagram of an example information handling system having electronic components. Generally, these electronic components are mounted on at least one printed circuit board (PCB) (motherboard) and communicate data and control signals over signal buses. In one example embodiment, the information handling system is a computer system. The computer system may be, for example, configured as a server or any other computer system configuration. The information handling system, generally referenced by the numeral 100, comprises at least one processor or CPU 110 communicatively coupled to a host bus(es) 120. While only one CPU 110 is depicted, it should be understood that any number of CPUs may be present in the information handling system according to the specific needs, operation, function, requirements and use of the information handling system and that these CPUs operate and function similarly to CPU 110. CPU 110 may include hardware and software components for the structure and operation of the process steps and system disclosed. While not specifically shown, it should be understood that any number of program modules comprising computer-readable instructions may be stored in the information handling systems memory and may be executed by CPU 110. This memory may be a hard disk, magnetic disk, optical disk, ROM, RAM or any other computer media known to one of ordinary skill in the art for the storage and retrieval of data, including executable or computer-readable instructions. Upon execution of the computer-readable instructions, certain actions may be performed as described in this disclosure. A memory controller (hub) or north bridge 140 is communicatively coupled to the CPU 110 via the host bus(es) 120. The north bridge 140 is generally considered an application specific chip set that provides connectivity to various buses, and integrates other system functions such as a memory interface. The chip set may also be packaged as an application specific integrated circuit (ASIC). The north bridge 140 typically includes functionality to couple the main system memory 150 to other devices within the information handling system 100. Thus, memory controller functions, such as main memory control functions, typically reside in the north bridge 140. Main memory 150 may also include system management mode (SMM) memory 152. In addition the north bridge 140 provides bus control to handle transfers between the host bus(es) 120 and a second bus(es), e.g., PCI bus 160, AGP bus 170 coupled to a video graphics interface 172 which can drive a video display (not shown). The north bridge 140 is coupled to the south bridge 130 via bus(es) 160. A third bus(es) 162 may also comprise other industry standard buses or proprietary buses, e.g., ISA, SCSI, II²C, SPI, USB, low pin count (LPC) buses through a south bridge(s) (bus interface) 130. A disk controller 166 and input/output interface(s) 164 may be coupled to the third bus(es) 162. At least one of the input/output interfaces(s) 164 may be used in combination with a baseboard management controller, serial port and/or Ethernet network interface card (NIC). The south bridge 130 may generate an SMI interrupt on bus(es) 132 which is coupled to the CPU 110. The SMI interrupt may be triggered by a hardware event, for example, a thermal management event or a power management event, at input/output interfaces 164. The SMI interrupt may also be triggered from a software event generated at the CPU 110 that when received by the South Bridge initiates an SMI interrupt, for example, the software event may be a request to validate a password or to change a setup variable.

Figure 2:
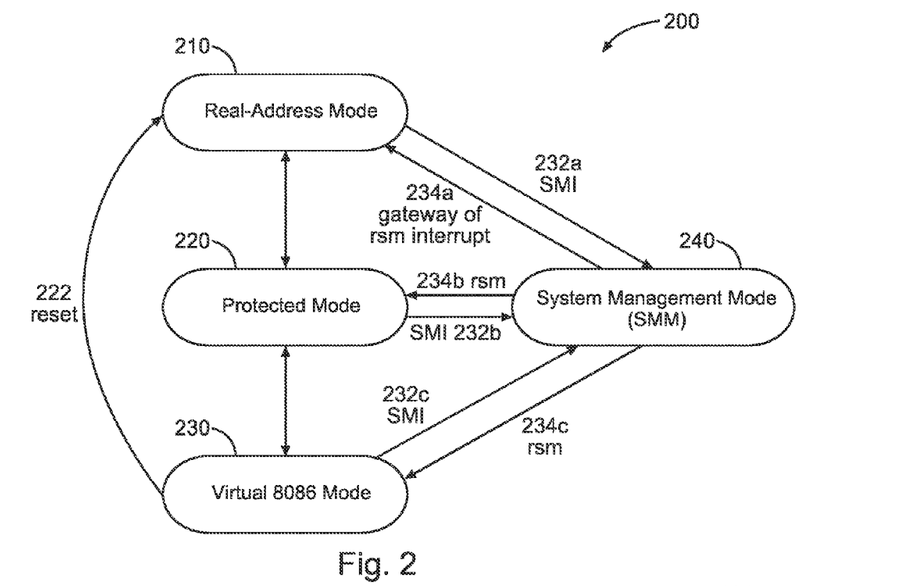
FIG. 2 is a block diagram of modes of an information handling system.

Referring to FIG. 2, depicted generally at 200 is a flow diagram of possible modes of an information handling system. Possible modes include real-address mode 210, protected mode 220, virtual 8086 mode 230, and system management mode (SMM). SMM 240 is entered by asserting either a hardware interrupt or a software interrupt called a system management interrupt (SMI) 232a-c from any other mode. Once SMM is entered, the operating system is placed in a frozen state for the duration of the mode. SMM is exited by issuing a resume operation instruction ("rsm") 234a-c. Exiting SMM unfreezes or restores the operating system to the identical state that existed prior to entering SMM (except for any modifications, for example modifications to system variables, specifically made during SMM). Exiting virtual 8086 mode 230 may also cause a reset 222 of variables when returning to real-address mode 210.

Figure 3:
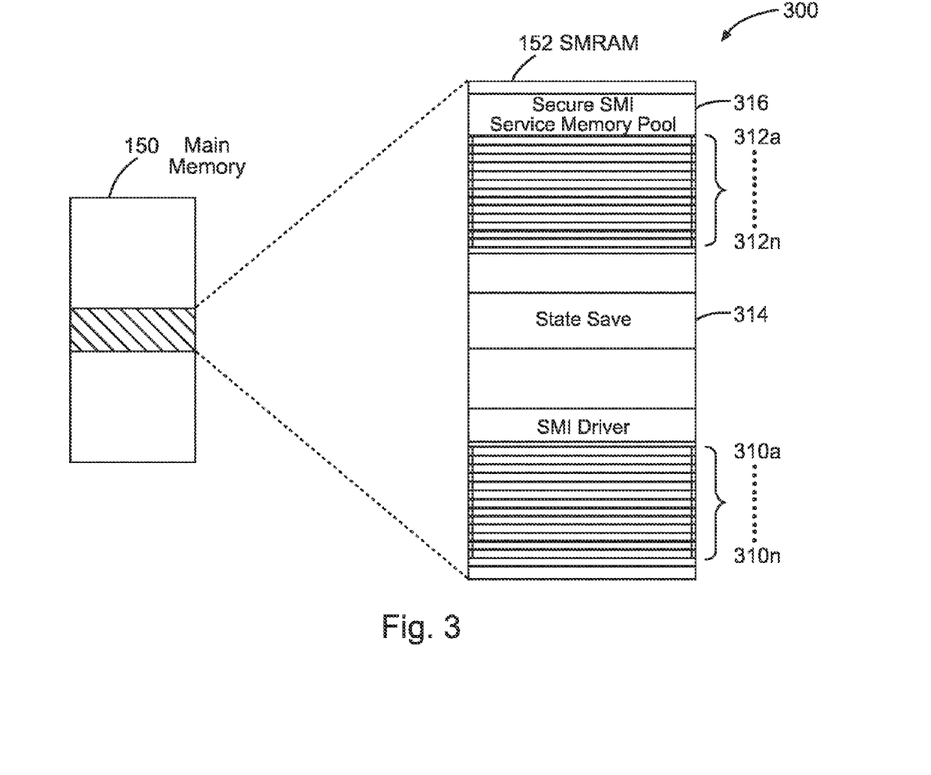
FIG. 3 is a block diagram of main memory, including system management RAM (SMRAM)

Referring to FIG. 3, depicted generally at 300 is a block diagram of main memory 150 of an information handling system 100. More specifically, depicted is a more detailed block diagram of SMM memory 152. Main memory 150 may be RAM or any other type of memory known to one of ordinary skill in the art. Main memory 150 may have a defined address space of memory called SMM memory 152 for use during an SMI interrupt. SMM memory 152 may be SMRAM or any other type of memory known to one of ordinary skill in the art. Upon the triggering of an SMI interrupt(s) 132, variables associated with the CPU 110 are saved in an address space State Save 314 of SMM memory 152 and SMM is entered. SMM may store the complete CPU 110 state information or only partial CPU 110 state information. Execution of the program associated with the SMI interrupt(s) 132 begins according to the SMI Driver(s) 310a-n. Multiple SMI Driver(s) 310a-n may be associated with an SMI interrupt(s) 132. Multiple SMI interrupts 132 may also be asserted. SMM allocates memory from a reserved pool of memory, Secure SMI Services Memory Pool 316. The Secure SMI Services Memory Pool 316 may include multiple allocated blocks of memory 312a-n. Allocated Block(s) of Memory 312a-n are used by the SMI Driver(s) 310a-n to store variables used during execution of the program associated with the SMI interrupt(s) 132. Upon exiting SMM, allocated Block(s) of Memory 312a-n may be erased and returned to the Secure SMI Services Memory Pool 316. Also, the CPU 110 state variables stored in State Save 314 may be restored.

Figure 4:
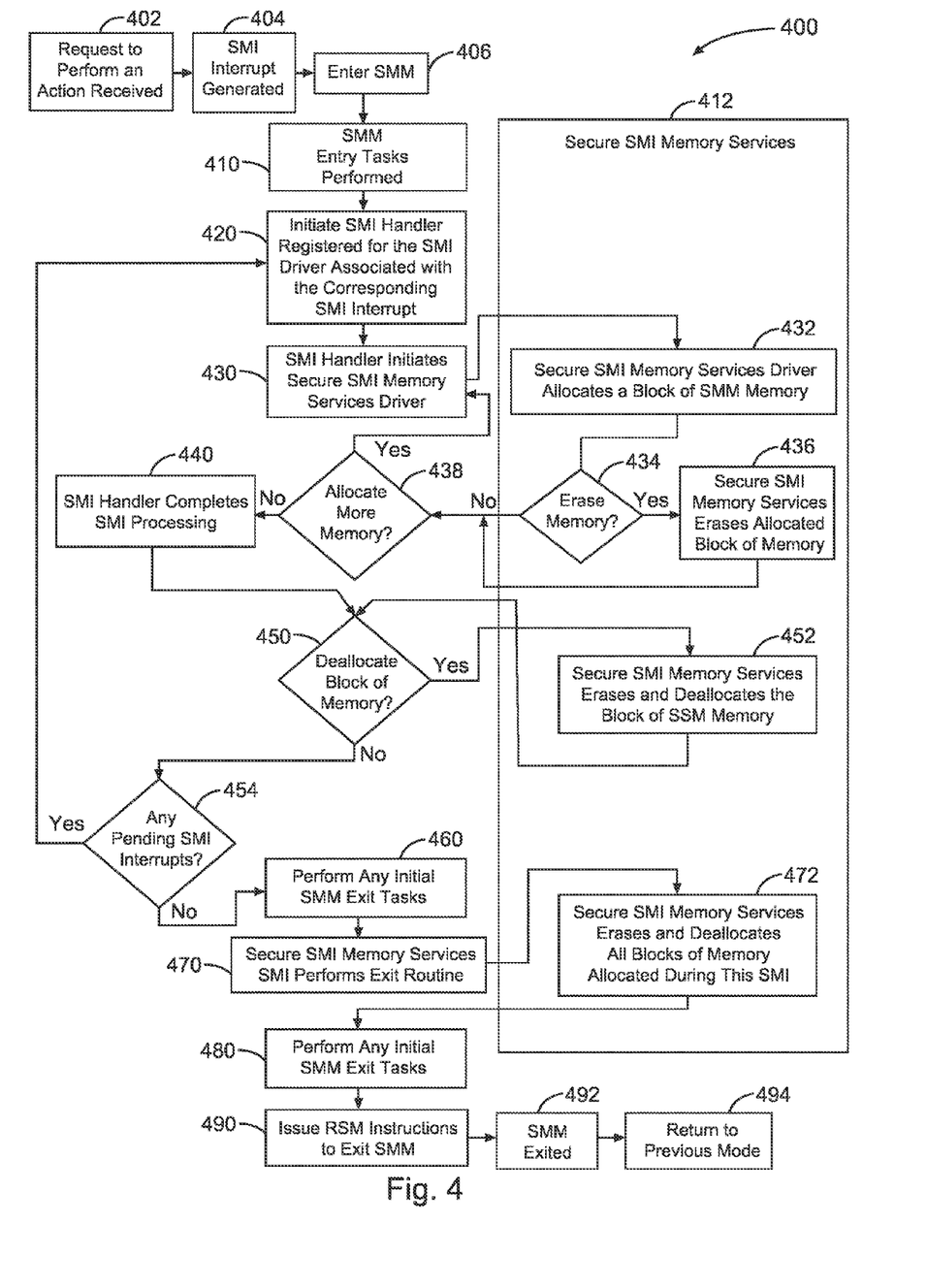
FIG. 4 is a flow diagram for performing a secure SMI memory services action.

Referring to FIG. 4, depicted generally at 400 is a flow diagram for performing secure SMI services according to one example embodiment of the present disclosure. In step 402 a request is received to perform a requested action by South Bridge 130. This request may be generated, for example, by software executing a instructions at CPU 110. This request may also be generated, for example, by hardware 164. The requested action may include thermal management, power management, change/alter system variables, or any other action known to one of ordinary skill in the art. An SMI interrupt is generated at step 404 that corresponds to the requested action. The requested action may correspond to one or more SMI interrupts and more than one action may be requested. At step 406, the SMM is entered. Next, at step 410, SMM entry tasks are performed. SMM entry tasks may include saving certain CPU state information. Step 420 initiates the SMI handler registered for the SMI driver associated with the corresponding SMI interrupt. Each SMI interrupt has a corresponding SMI handler. One or more SMI drivers may be associated with the SMI handler for a given SMI interrupt. More than one SMI interrupt may be received for processing while in SMM. At Step 430, the SMI handler initiates the Secure SMI Memory Services Driver (which may include one or more drivers for a given SMI handler associated with an SMI interrupt) for the corresponding SMI interrupt. The Secure SMI Memory Services are represented at 412. The Secure SMI Memory Services Driver (or SSMS driver) associated with the SMI handler allocates a block of SMM memory from memory pool 316 at Step 432. The allocated block of SMM memory may include multiple blocks of allocated memory as shown in FIG. 3 as 312a-n. The allocated blocks of memory 312a-n may be allocated according to a predetermine size, for example, 8 Mb, 16 Mb, 32 Mb, etc. Also, allocated blocks of memory 312a-n may be allocated according to specific requirements of the SMI driver and SMI handler and may each be of varying and different sizes. For example, 312a may be allocated as a 16 Mb block of memory while 312b may be allocated as a 32 Mb block of memory. Step 434 determines if the allocated memory at step 432 should be erased prior to performing the requested action. If the allocated memory should be erased, then at step 436 the Secure SMI Memory Services performs a secure erase of the allocated block of memory. Step 438 determines if more memory should be allocated. If so, then the process returns to Step 430. Steps 430, 432, 434, 436 and 438 may be repeated until all requested memory blocks have been allocated.

Figure 5:
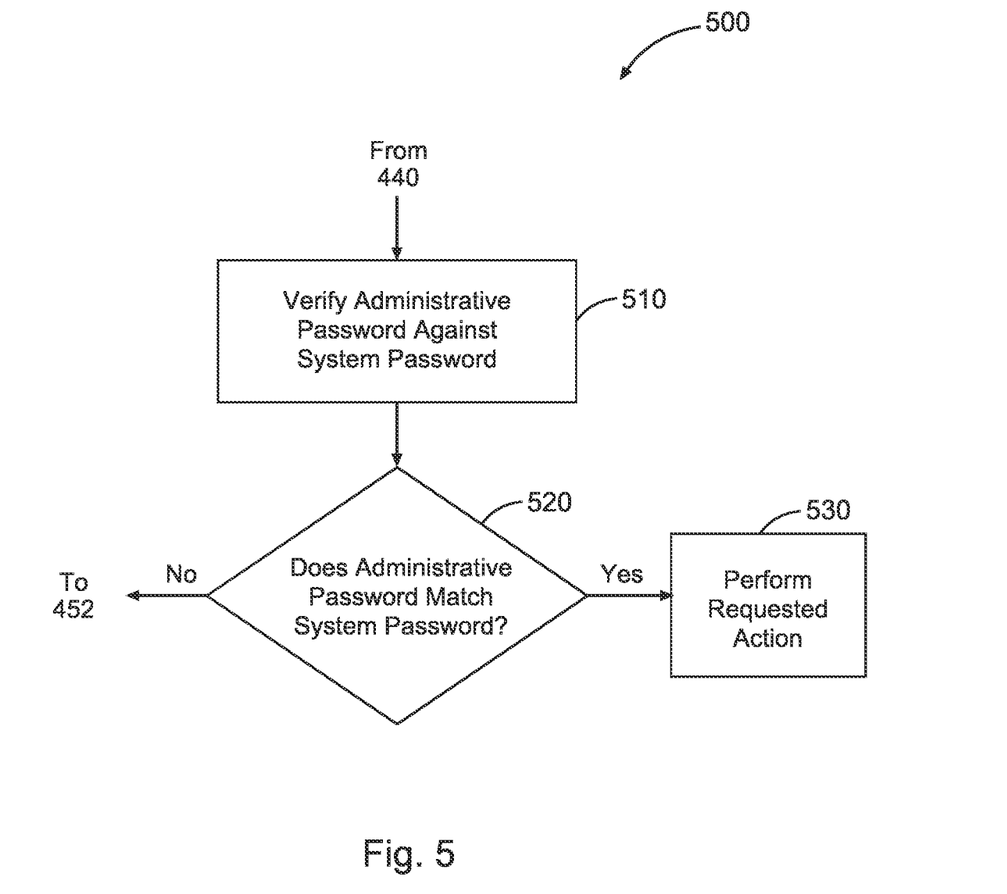
FIG. 5 is a flow diagram for performing password verification of a secure SMI memory services action.

Once the memory blocks required by the SMI handler have been allocated, the SMI handler completes SMI processing at Step 440. The SMI processing completed at Step 440 may include any steps necessary to perform the requested action received at Step 402. For example, FIG. 5 at 500 depicts steps necessary to perform password validation prior to performing the requested action at Step 530. At step 510 the administrative password, which may be a user-entered password or a previously stored password, is verified against the system password, which may be stored in non-volatile memory. Step 520 determines if the passwords match. If the passwords match, then at Step 530 the requested action is performed. The requested action may be an action to alter certain system variables. The requested action may also be to perform certain processes or steps associated with power management or thermal management. If the passwords do not match, then the requested action is not performed and the allocated memory block(s) is erased and the memory block is freed. The allocated memory block(s) may now be free memory of the Secure SMI Services Memory Pool 316.

Returning to FIG. 4, once the SMI handler has completed all SMI processing, Step 450 determines if any memory needs to be deallocated. If memory does need to be deallocated, then at Step 452, the Secure SMI Memory Services erases and deallocates the allocated block(s) of SMM memory. Next, Step 454 determines if any pending SMI interrupts still need to be serviced. Control returns to Step 420 if there are any pending SMI interrupts. The above steps are repeated until all pending SMI interrupts have been serviced. Once all pending SMI interrupts have been serviced, then Step 460 performs any initial SMM exit tasks. Following completion of the SMM exit tasks, then Step 470 performs the Secure SMI Memory Services SMI exit routine(s). At Step 472, the Secure SMI Memory Services erases and deallocates all allocated blocks of memory during the SMI. Next, Step 480 performs any final SMM exit tasks. At Step 490, an RSM instruction is issued to exit SMM. SMM is exited, Step 492, and the information handling system 100 returns to the previous mode. The information handling system may also return to any other mode associated with the information handling system, examples of which have been depicted in FIG. 2.

Although this disclosure has been described with respect to the operation of SMI within an information handling system, it should be recognized that the Secure SMI Memory Services described herein may be implemented with any information handling system. Consistent with this disclosure, for example, an information handling system may comprise one or more of a server, workstation, desktop computer, laptop computer, or any other computer system known to one of ordinary skill in the art.

The concepts disclosed herein should not be understood to be limited to the exemplary embodiments described, but should be understood to encompass all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

What is claimed is:

1. An information handling system for securing SMI memory services, comprising:
   a main memory;
   a system management mode (SMM) memory, wherein SMM memory is part of the main memory;
   a memory pool, wherein the memory pool is reserved memory within SMM memory and includes one or more blocks of memory;
   a system management interrupt (SMI) driver, wherein the SMI driver is initiated by triggering an SMI interrupt and wherein the one or more blocks of memory is communicatively coupled to one or more SMI handlers associated with the SMI driver; and
   a secured SMI memory services (SSMS) driver, wherein the SMI driver is communicatively coupled to the one or more SMI handlers and the block of memory, wherein the SSMS driver allocates the block of memory upon a request from the one or more SMI handlers, wherein the one or more SMI handlers uses the allocated block of memory to perform one or more actions, and wherein the SSMS driver performs a secure erase of the block of memory upon completion of the one or more actions by the SMI driver.

2. The system of claim 1, wherein the block of memory is system management RAM (SMRAM).

3. The system of claim 1, wherein the SMI driver initiates the SSMS driver to deallocate the block of memory upon completion of the one or more actions by the SMI driver.

4. The system of claim 3, wherein the SMI driver validates an administrative password against a system password.

5. The system of claim 1, wherein the SMI interrupt is a request to perform a system action that includes at least one of power management, thermal management, and alter one or more system variables.

6. A method for providing secure SMI memory services, comprising:
   requesting one or more actions;
   triggering an SMI interrupt;
   entering SMM;
   initiating an SMI driver associated with the SMI interrupt;
   initiating one or more SMI handlers registered to the SMI driver associated with the triggered SMI interrupt;
   requesting for each of the SMI handlers an allocation of one or more blocks of memory from a secure SMI memory services driver, wherein the one or more blocks of memory is requested from a memory pool associated with SMM memory;
   performing one or more actions by the SMI handler, wherein the SMI handler uses one or more of the allocated blocks of memory; and
   performing a secure erase of each block of memory by the secure SMI memory services driver after performing the one or more actions.

7. The method of claim 6, wherein the one or more actions includes at least one of a request to perform a password validation, alter system setup variables, perform thermal management and perform power management.

8. The method of claim 6, further comprising:
   validating a password against a system password before performing the one or more actions.

9. The method of claim 8, further comprising:
   hashing or transposing the password prior to validating the password.

10. The method of claim 6, further comprising:
    performing a secure erase of the one or more blocks of memory prior to performing the one or more actions by the SMI handler.

11. The method of claim 6, further comprising:
    deallocating the one or more blocks of memory prior to exiting SMM.

12. The method of claim 6, further comprising:
    performing SMM exit tasks.

13. The method of claim 6, further comprising:
    performing secure SMI memory services exit tasks.

14. The method of claim 6, wherein SMM memory is RAM.

15. The method of claim 6, wherein SMM memory is SMRAM.

16. An information handling system for securing SMI memory services, comprising:
    a processor; and
    a memory, wherein the memory includes executable instructions, that when executed, cause the processor to:
    request one or more actions;
    trigger an SMI interrupt enter SMM;
    initiate an SMI driver associated with the SMI interrupt;
    initiate one or more SMI handlers registered to the SMI driver associated with the triggered SMI interrupt;
    request for each of the SMI handlers an allocation of one or more blocks of memory from a secure SMI memory services driver, wherein the one or more blocks of memory is requested from a memory pool associated with SMM memory;

perform one or more actions by the SMI handler, wherein the SMI handler uses one or more of the allocated blocks of memory; and perform a secure erase of each block of memory by the secure SMI memory services driver after performing the one or more actions.

17. The information handling system of claim 16, wherein the one or more actions includes at least one of a request to perform a password validation, alter system setup variables, perform thermal management and perform power management.

18. The information handling system of claim 16, wherein the instructions that cause the processor to perform one or more actions by the SMI handler, further cause the processor to:

validate a password against a system password before performing the one or more actions.

19. The information handling system of claim 16, wherein the instructions that cause the processor to perform one or more actions by the SMI handler, further cause the processor to:

perform a secure erase of the one or more blocks of memory by the secure SMI memory services driver prior to performing the one or more actions by the SMI handler.

20. The information handling system of claim 16, wherein the instructions that cause the processor to perform one or more actions by the SMI handler, further cause the processor to:

deallocate the one or more blocks of memory prior to exiting SMM.

21. The information handling system of claim 16, wherein the instructions that cause the processor to perform one or more actions by the SMI handler, further cause the processor to:

perform SMM exit tasks.

* * * * *